US005631697A

United States Patent [19]
Nishimura et al.

[11] Patent Number: 5,631,697
[45] Date of Patent: May 20, 1997

[54] VIDEO CAMERA CAPABLE OF AUTOMATIC TARGET TRACKING

[75] Inventors: Ryuji Nishimura, Yokohama; Mayuko Oda, Kawasaki; Takuya Imaide, Fujisawa, all of Japan

[73] Assignee: Hitachi, Ltd., Tokyo, Japan

[21] Appl. No.: 458,682

[22] Filed: Jun. 2, 1995

Related U.S. Application Data

[63] Continuation of Ser. No. 208,628, Mar. 10, 1994, abandoned, which is a continuation-in-part of Ser. No. 159,132, Nov. 30, 1993, Pat. No. 5,412,487, which is a continuation-in-part of Ser. No. 940,348, Sep. 3, 1992, Pat. No. 5,347,371, which is a continuation-in-part of Ser. No. 798,892, Nov. 27, 1991, Pat. No. 5,293,255.

[30] Foreign Application Priority Data

Mar. 10, 1993  [JP]  Japan .................. 5-049422

[51] Int. Cl.⁶ .................................................. H04N 7/18
[52] U.S. Cl. .............................................. 348/172; 348/170
[58] Field of Search ................................. 348/169–172, 348/352, 354, 356, 362–364, 345, 349; 358/452–453

[56] References Cited

U.S. PATENT DOCUMENTS

| | | | |
|---|---|---|---|
| 3,953,669 | 4/1976 | Saccomani et al. | 348/170 |
| 4,539,590 | 9/1985 | Gage | 348/172 |
| 4,644,405 | 2/1987 | Roy et al. | 348/170 |
| 4,796,187 | 1/1989 | North | 348/171 |
| 5,007,736 | 4/1991 | Daniel et al. | 348/172 |

*Primary Examiner*—Stephen Brinich
*Attorney, Agent, or Firm*—Antonelli, Terry, Stout & Kraus

[57] ABSTRACT

An image signal provided by an image pickup device, such as a CCD, is converted into a video signal by a signal processor. An extraction means extracts a candidate object region from the current video signal and an object region determined a certain time before by a decision means is read from a memory. For example, the decision means compares an overlapping region in which the candidate object region and the object region read from the memory overlap each other and provides a new object region a size larger than the overlapping region and replace the object region with the new object region to update the contents of the memory. On the other hand, a calculating means calculates the features of the object region including the position of the centroid of the object region on a screen. A control means, such as a microcomputer, controls the image pick up device on the basis of information about the features so that a region including the target object substantially in its central part is cut out as a video signal. Consequently, the target object can be surely tracked regardless of objects other than the target object included in a scene.

37 Claims, 13 Drawing Sheets

VIDEO CAMERA CAPABLE OF AUTOMATIC TARGET TRACKING

CROSS REFERENCES TO RELATED APPLICATION

This application is a continuation application of Ser. No. 08/208,628, filed Mar. 10, 1994, now abandoned, which is a continuation-in-part application of U.S. patent application Ser. No. 159,132, filed Nov. 30, 1993, now U.S. Pat. No. 5,412,487, which is a continuation-in-part patent application of U.S. patent application Ser. No. 940,348 filed Sep. 3, 1992, now U.S. Pat. No. 5,347,371, which is a continuation-in-part patent application of U.S. patent application Ser. No. 798,892 filed Nov. 27, 1991, now U.S. Pat. No. 5,293,255 the subject matter of each of the aforementioned applications being incorporated by reference herein.

BACKGROUND OF THE INVENTION

The present invention relates to an image pickup apparatus, such as a video camera, or an automatic target tracking video camera system including a video camera and, more particularly, to a video camera capable of automatic target tracking and automatic zooming.

Active research and development efforts concerning the automation of the operation of cameras have been made in recent years with the progressive spread of video cameras and camcoder, i.e., video cameras integrally provided with a VCR. Techniques relating to an automatic iris, automatic white balance control and automatic focusing developed through the research and development efforts have been put to practical uses. However, the automation of operations for directing the camera toward a particular object, controlling the direction of the camera to keep the particular object within the angle of view of the camera and zooming to adjust the angle of view has not been practically realized and these operations must be manually carried out.

It has been thought that a detecting means for detecting the position of an object and a camera moving means for directing a camera toward an object are necessary to track a target object and to pick up the image of the target object.

A method relating to the detecting means, disclosed in Japanese Patent Laid-open (Kokai) No. 59-208983 detects a target object on the basis of the movement of the target object determined on the basis of a difference signal representing the positional difference between images taken at a fixed interval. However, when detecting the target object from its movement, the camera will fail to move correctly if an object other than the target object moves because the object other than the target object will be mistakenly detected.

Apparatus, in which an electrically powered pedestal and a camera unit are movable, relating to the camera moving means are proposed in Japanese Patent Laid-open (Kokai) Nos. 59-16357 and 63-72271. These apparatus, however, need a mechanism for moving the camera unit including the pedestal to change the direction of the camera, which inevitably enlarges the scale of the apparatus and increases power consumption. Although these apparatus are capable of tracking a target object in a wide tracking range, these apparatus have a large moment of inertia and are unable to operate at a high response speed. A method disclosed in Japanese Patent Laid-open (Kokai) No. 4-329773 employs an externally drivable optical decentering device, such as a prism having a variable apex angle. A method disclosed in Japanese Patent Laid-open (Kokai) No. 2-210982 controls the mode of driving a solid-state image pickup device electrically. Although this method of controlling the mode of driving the solid-state image pickup device can be practiced by a small-scale apparatus at a high response speed and at a low power consumption, this method is not capable of tracking a target object in a wide tracking range. Thus, each of these previously proposed methods has its merits and demerits and none of them is perfectly satisfactory.

Accordingly, it is an object of the present invention to solve the foregoing problems and to provide an automatic target tracking camera system capable of smoothly and accurately tracking a target object that moves about in a wide range.

OBJECT AND SUMMARY OF THE INVENTION

It is an object of the present invention to provide a video camera or an automatic target tracking camera system, capable of reliably tracking a target object.

Another object of the present invention is to provide a video camera capable of smoothly and accurately tracking a target object that moves about in a wide range or an automatic target tracking camera system.

The present invention provides, to achieve the foregoing objects, a video camera comprising: an extraction means for extracting an extracted candidate region through a decision that part of an input video signal meeting a predetermined condition is an image of a target object; a storage device that stores an input object region; a decision means for comparing the extracted candidate region extracted by the extraction means and the object region stored in the storage device to decide a new object region and storing the new object region in the storage device; a calculating means for calculating a feature data representing the feature of the target object on the basis of the new object region; and a control means for tracking the target object. An image signal provided by an image pickup device, such as a CCD, is converted into a corresponding video signal by a signal processing circuit. The extraction means provides the extracted candidate region on the basis of the present video signal, while the storage device provides the object region determined by the decision means a certain time before the present. The decision means detects, for example, the overlapping portions of the two regions, decides a new object region which is a size larger than the overlapping portions and provides the new object region. At the same time, the decision means stores the new object region in the storage device to update the contents of the storage device. The calculating means calculates and provides the feature data of the object region, such as the position of the centroid of the object region on a screen. The control means, such as a microcomputer, controls the image pickup device and the signal processing circuit so that the picture of the object is displayed approximately in the central part of a screen; that is, the control means controls the image pickup device and the signal processing circuit so that the centroid of the picture of the object coincides substantially with the center of the reproducing screen. Consequently, the target object can be surely tracked regardless of the movement of objects other than the target object.

To achieve the object, target tracking means respectively having different characteristics, i.e., a mechanical target tracking means employing an electrically powered pedestal and capable of operating for target tracking in a comparatively wide range, and an electrical target tracking means capable of quickly and accurately controlling the mode of driving the solid-state image pickup device, are used in combination. The automatic target tracking camera system comprises, in combination, a video camera provided with an electrical target tracking means, and a movable supporting unit, such as an electrically powered pedestal, for supporting the video camera and changing the direction of the video camera. This combination can be realized by controlling the movable supporting means, as well as the video camera, by a video camera control means. The video camera control means exerts its control function so as to make the best use of the advantages of the target tracking means respectively having different characteristics. Concretely, the mechanical target tracking means, i.e., the movable supporting unit or the like, is controlled for a rough target tracking operation so as to change the direction of the video camera so that the target object is always within the angle of view, and the electrical target tracking means is controlled for a minute target tracking operation so as to provide a region including the target object in its central part, cut out from an optical image of a scene within the angle of view, i.e., an optical image of a scene including the target object produced by the image pickup device. Thus, the automatic tracking camera system is capable of more smoothly and accurately tracking the target object in a wide range than the automatic tracking camera system comprising only a mechanical target tracking means and an optical target tracking means.

BRIEF DESCRIPTION OF THE DRAWINGS

The present invention will be more apparent form the following detailed description taken in connection with the accompanying drawings, in which.

DETAILED DESCRIPTION OF THE PREFERRED EMBODIMENTS

Preferred embodiments of the present invention will be described hereinafter with reference to the accompanying drawings.

Figure 1:
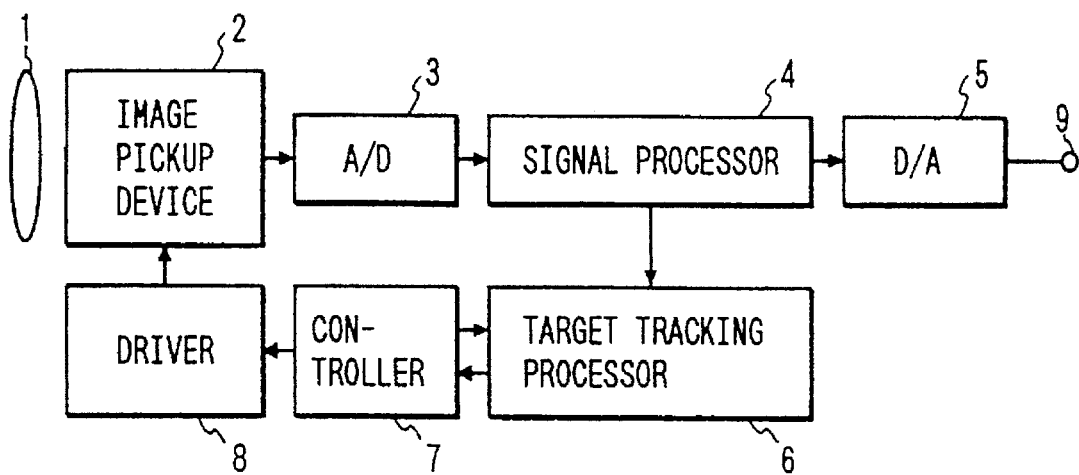
FIG. 1 is a block diagram of an essential part of a video camera in a preferred embodiment according to the present invention.

FIG. 1 is a block diagram of a video camera in a first embodiment according to the present invention. The video camera comprises a lens unit 1, an image pickup device 2, such as a CCD or a MOS type image pickup device, an A/N converter (analog-to-digital converter) 3, a signal processor 4, a D/A converter (digital-to-analog converter) 5, a target tracking processor 6, a controller 7, such as a microcomputer, a driver 8 for driving the image pickup device 2, and an output terminal 9.

The image pickup device 2 is provided with light receiving elements arranged in a two-dimensional arrangement. The image pickup device 2 converts an optical image focused on its light receiving surface by the lens unit 1 photoelectrically into an analog image signal and gives the same to the A/D converter 3. The image pickup device 2 executes photoelectric conversion periodically. The driver 8 controls the image pickup device 2 to time the operation for photoelectric conversion and signal generation. The driver 8 is capable of driving the image pickup device 2 at a high speed to extract and provide a signal representing an optional part of the imaging surface of an image pickup device, which will be described later. Such a function is utilized for target tracking. The video signal processor 4 produces a luminance signal and a chrominance signal on the basis of the digital signal provided by the A/D converter 3, processes the luminance signal and the chrominance signal by known signal processing method for gamma correction and white balance correction to provide a video signal. The video signal provided by the video signal processor 4 is converted into a corresponding analog video signal by the D/A converter 5 and the analog video signal is applied to the output terminal 9.

The target tracking processor 6 processes the output video signal of the video signal processor 4 to extract the image of a target object for target tracking and determines the coordinates of the centroid of the image of the target object. The method of detecting the target object and determining the centroid of the image of the target object may be for example, a method disclosed in Japanese Patent Laid-open (Kokai) No. 59-208983, which determines the centroid on the basis of the difference between images sampled at a fixed interval or a method disclosed in U.S. patent application Ser. No. 07/798,892, which will be described later. The controller 7 controls the driver 8 so that the picture of the target object is displayed in the central part of a screen.

Figure 2A:
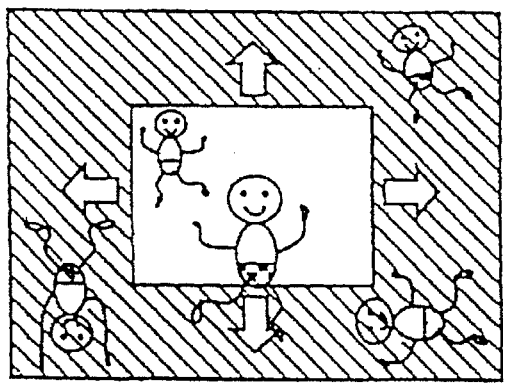
FIGS. 2(a) and 2(b) are pictorial views showing pictures representing an image formed on the imaging surface of an image pickup device included in the video camera of FIG. 1 and an image displayed on a monitor screen, respectively.
Figure 2B:
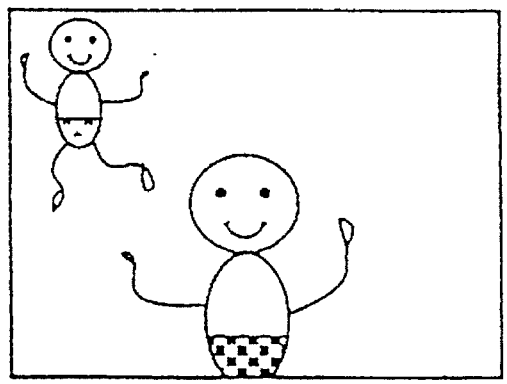

The target tracking operation of the controller 7 will be described with reference to FIGS. 2(a) and 2(b). Shown in FIG. 2(a) is a picture of a scene including a plurality of persons taken in a wide-angle mode and formed by the image pickup device 2 on the imagining surface. The image pickup device 2 provides an image signal representing a small area surrounded by a hatched area shown in FIG. 2(a) and hence the image in the hatched area is not displayed on an output screen. The controller 7 gives the coordinates of a read start position on the image pickup device 2, i.e., the upper left-hand corner of the small area, to the driver 8 to control the position of the part to be displayed. The controller 7 controls the driver 8 so as to read image signals stored in the specified light receiving elements of the image pickup device 2. An image pickup device capable of optionally controlling the position of the output part on the imaging surface thereof and a method of driving the same are disclosed in, for example, Japanese Patent Laid-open (Kokai) Nos. 2-231873 and 3-77483. Since these methods controls the driver at a minute pitch equal to 1/256 of pixel pitch for each field, which is formed sixty times per second in the NTSC system, accurate target tracking operation can be achieved at a high response speed. FIG. 2(b) shows a picture formed by processing the image signal provided by the image pickup device 2 by the signal processor 4 and displayed on a monitor screen. A target person, i.e., the target object, is displayed in the central area of the monitor screen.

If the target person, i.e., the target object, is moving in the scene when picking up the scene, the following control operation is executed for target tracking. First, the difference $\Delta x$ between the coordinates of the centroid of the target object and the center of the screen is determined on the basis of the data of the coordinates of the centroid of the target object provided by the target tracking processor 6. Then, $S = S_o + k \cdot \Delta x$, where $S_o$ is the coordinates of the present read start position on the image pickup device 2, S is the coordinates of the next read start position on the image pickup device 2, and k is a constant related with coordinate transformation and time constant. The controller 7 gives the coordinates S of the next read start position thus determined to the driver 8 for automatic target tracking. This control procedure for automatic target tracking is the same as a control procedure which will be described later with reference to FIG. 13 or 15.

Thus, in this video camera, the automatic target tracking of the target object can be achieved only by an electrical means which changes the read start position on the image pickup device when reading a signal provided by the image pickup device. Accordingly, the video camera has a simple configuration and operates at a comparatively low power consumption.

Figure 3:
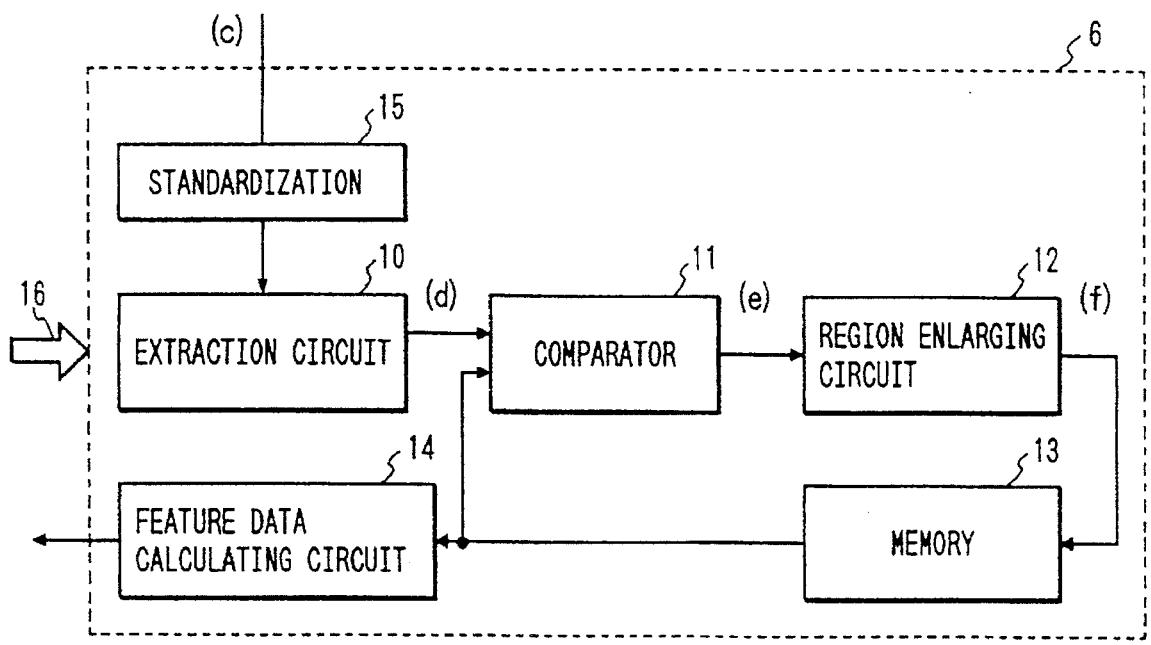
FIG. 3 is a block diagram of a target tracking processor included in the video camera of FIG. 1.

FIG. 3 is a block diagram of the target tracking processor 6 of the video camera of FIG. 1, having a configuration different from that of the foregoing conventional target tracking processor. This target tracking processor 6 is an application of the techniques disclosed in U.S. patent application Ser. No. 07/798,892. Referring to FIG. 3, the target tracking processor 6 comprises an extraction circuit 10, a comparator 11, a region enlarging circuit 12, a memory 13, a feature data calculating circuit 14 and a standardizing circuit 15.

The target tracking processor 6 extracts an image signal representing the target object by using the data of luminance and color difference. The video signal given to the target tracking processor 6 by the signal processor 4 of FIG. 4 includes a luminance signal Y and two color difference signals Cr and Cb, which will be inclusively designated as "color difference signals C" hereinafter. The standardizing circuit 15 standardizes the input color difference signals C by dividing the color difference signals C by the luminance signal Y (C/Y) to convert the same into chrominance signals C'. Since the standardized signal standardized on the basis of the luminance signal Y is free from the influence of the variation of the luminance signal Y, the image of the target object can be stably extracted even if the target object is shaded or the illuminance on the target object changes.

Figure 10:
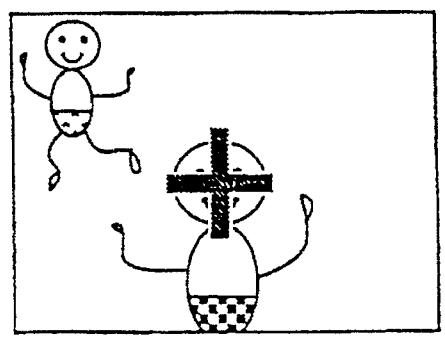
FIG. 10 is a pictorial view of a picture provided with a marker generated by the video camera of FIG. 9.

The extraction circuit 10 extracts the image of the target object in the following manner. Generally, the luminance and chrominance of the target object are different from those of the background. Accordingly, a part of the image of the scene, having a specified luminance and a specified chrominance is extracted as the image of the target object. Suppose that a person is the target object, a part of the image of the scene, corresponding to a flesh-colored part of the scene is extracted. Suppose that the luminance Y and the chrominance C' of the skin of the face of the person are in ranges meeting inequalities:

$$Y_L < Y < Y_H \qquad (1)$$

$$C_L' < C' < C_H' \qquad (2)$$

where $Y_L$, $Y_H$, $C_L'$ and $C_H'$ are constants defining conditions for extraction. Then, the extraction circuit 10 provides an output signal of HIGH when the input signal satisfies inequalities (1) and (2) or an output signal of LOW when the input signal does not satisfy inequalities (1) and (2); that is, the extraction circuit 10 binarizes input signals to provide a signal of HIGH only when an input signal representing the target object is given thereto. The controller 7 (FIG. 1) gives the constants $Y_L$, $Y_H$, $C_L'$ and $C_H'$ through an input terminal 16 to the target tracking processor 6. These constants may be set beforehand for the extraction circuit 10 when tracking a target object having a known luminance and a known chrominance or may be set automatically by a method which will be described later. The details of the configuration of the extraction circuit 10 is illustrated in FIG. 10 of the specification of U.S. patent application Ser. No. 940,348.

Figure 9:
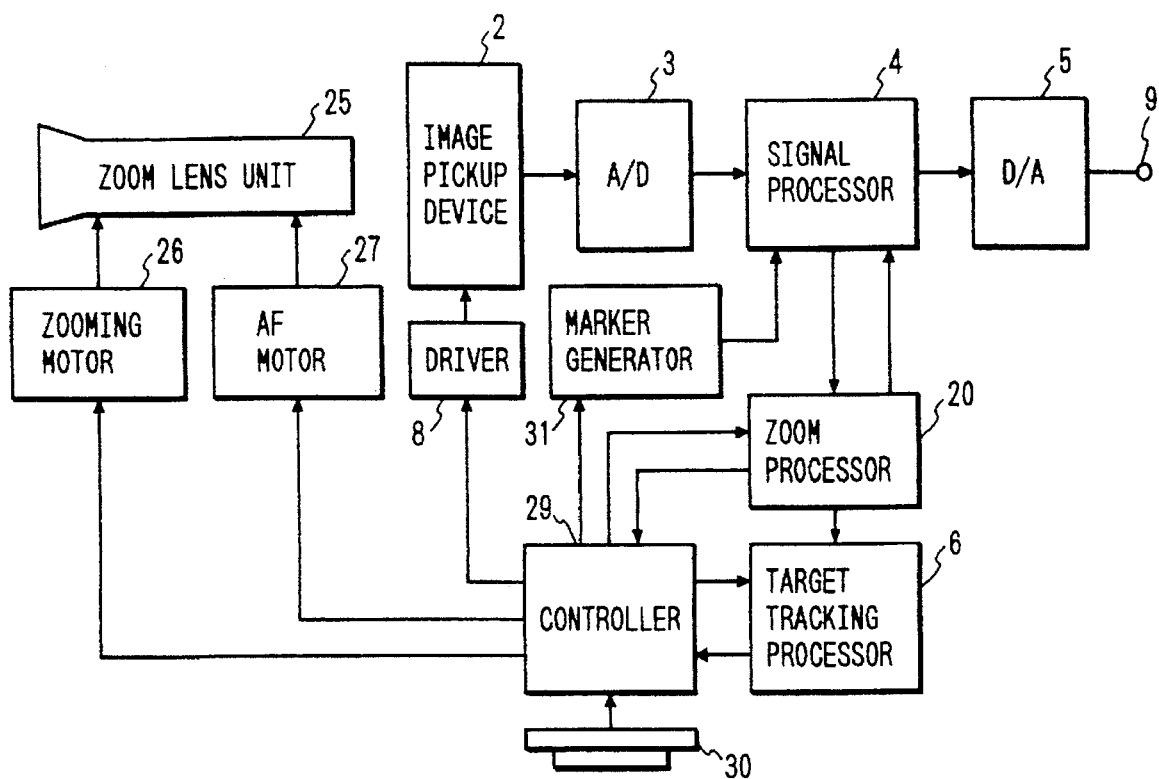
FIG. 9 is a block diagram of a video camera formed by incorporating a marker generating circuit into the video camera of FIG. 8.

The extraction circuit 10, similarly to an extraction circuit 3 illustrated in FIG. 9 of the specification of the same U.S. patent application, may be provided with a plurality of binarizing circuits to extract the image of the target object that meets a plurality of conditions, which enables the extraction of the images of the hair of the head and the clothes of a person as well as a part of the image corresponding to a flesh-colored part of the scene to track the whole person. In the following description, a region thus extracted by binalizing the input signal will be called "extracted candidate region".

The comparator 11 compares the data of the extracted candidate region and the data of an object region stored beforehand in the memory 13 and generates a signal representing a comparison region. The comparator 11 is, for example, an AND circuit that carries out the logical AND. The comparator 11 provides a signal that only the overlapping parts of the extracted candidate region and the object region are HIGH as a comparison region.

The region enlarging circuit 12 enlarges the region represented by the output signal of the comparator 11 by a size. The region enlarging circuit 12 carries out the logical OR between an input signal representing a pixel and an input signal representing another pixel adjacent to the former and provides the result of the logical OR. This procedure is explained, for example, in Masakazu Ejiri, "Industrial Image Processing", ISBN4-7856-1159-6, p. 50, May 31, 1988.

The output of the region enlarging circuit 12, i.e., the new object region, is stored in the memory 13. The feature calculating circuit 14 calculates the coordinates of the centroid of the object region and the size of the same, i.e., the features of the object region, on the basis of the data of the new object region stored in the memory 13, and gives the results of calculation to the controller 7 (FIG. 1). This target tracking procedure including the foregoing operations is carried out for each field or each frame of the video signal.

Figure 4A:
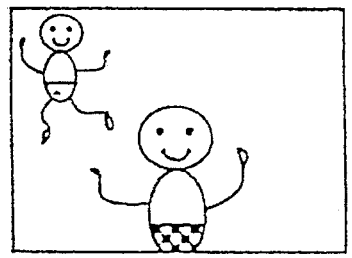
FIGS. 4(c), 4(d), 4(e) and 4(f) are pictorial views of images corresponding to signals provided respectively by the components of the target tracking processor, respectively.
Figure 4B:
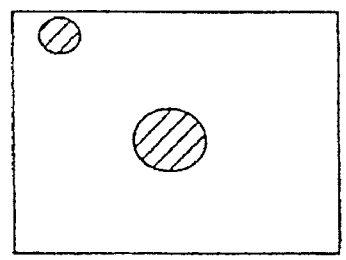
Figure 4C:
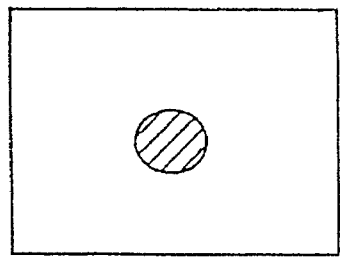
Figure 4D:
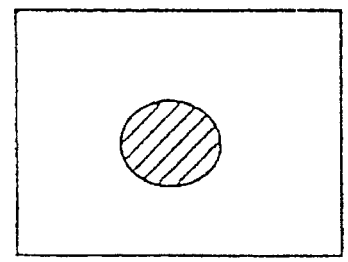

The target tracking procedure will be described hereinafter on an assumption that an image shown in FIG. 4(c) is given. In the input image shown in FIG. 4(c) showing a scene including two persons, the person in the central part of the image is a target object. Extraction conditions for the operation of the extraction circuit 10 are set beforehand so that the extraction circuit 10 extracts a region of an image of a scene, corresponding to a flesh-colored part of the scene. FIG. 4(d) shows an extracted image corresponding to the persons' faces provided by the extraction circuit 10 on the extraction conditions, in which hatched regions are extracted candidate regions. When a target tracking operation for tracking the person corresponding to the person's image in the central region of the screen is in process, an enlarged region image shown in FIG. 4(f) provided by the region enlarging circuit 12 has been stored in the memory 13. In this case, it is assumed that the movement of the target person is negligible. Signals representing the images shown in FIGS. 4(d) and 4(f) are given to the comparator 11, the comparator 11 carries out the logical AND between the two signals and provides a signal representing a comparison output image shown in FIG. 4(e), in which a hatched part is a comparison region.

This target tracking procedure is executed to track the target object. Although the movement of the target object is ignored in the foregoing explanation of the target tracking procedure, target tracking is achieved by the same target tracking procedure even if the target object is moving, provided that the extracted candidate region and the object region stored in the memory 13 overlap each other. When starting the target tracking operation, an initial object region must be stored in the memory 13. The initial object region may be a suitable small region in the central part of the screen. In this case, the video camera must be set so that an image of a target object is formed in the central part of the screen before starting the target tracking operation, and then the target tracking operation is started.

As is apparent from the foregoing description, the present invention is capable of stably tracking a moving target object in a real-time mode through the extraction of the image of the target object on the basis of luminance and chrominance. Since the objective regions determined in two successive target tracking cycles are compared to extract the image of the target object, the target object can be surely tracked even if a part of a scene having luminance and chrominance similar to those of the target object exists near the target object. The video camera in this embodiment capable carrying out the foregoing target tracking procedure may be used in combination with an apparatus capable of mechanically controlling the direction of the video camera, such as an electrically powered pedestal, for automatic image pickup operation in addition to the control of the reading of the output of the image pickup device.

A video camera in a second embodiment according to the present invention will be described with reference to FIG. 5, in which parts like or corresponding to those shown in FIG. 1 are denoted by the same reference characters. Referring to FIG. 1, the video camera comprises a lens unit 1, an image pickup device 2 of a CCD type or a MOS type, an A/D converter 3, a signal processor 4, a D/A converter 5, a target tracking processor 6, a driver 8 for driving the image pickup device 2, an output terminal 9, an image memory 18 and a memory controller 17 for controlling the image memory 18. Whereas the video camera shown in FIG. 1 controls the reading of signals from the image pickup device 2 for target tracking, the video camera shown in FIG. 5 controls the reading of data from the image memory 18 for target tracking.

Figure 5:
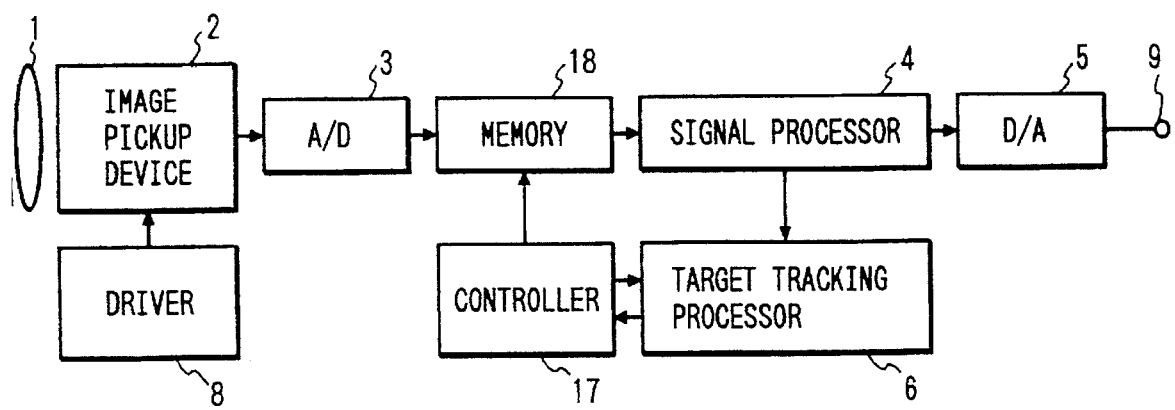
FIG. 5 is a block diagram of a block diagram of an essential part of a video camera in another embodiment according to the present invention.

In the video camera shown in FIG. 5, a video signal representing one field, provided by the image pickup device 2 is converted into a corresponding digital signal, and the digital signal is stored temporarily in the image memory 18. The digital signal stored in the image memory 18 represents a picture which is similar to the picture typically shown in FIG. 2(a). Accordingly, the controller 17 controls the reading of the digital signal from the image memory 18 for target tracking in the same manner as that in which the controller 7 of the video camera of FIG. 1 controls the read start position on the image pickup device 2. Since the video camera, similarly to the video camera shown in FIG. 1, tracks the target object automatically only by an electrical means which changes the read start position when reading the digital signal from the image memory 18, the video camera has a simple configuration and operates at a comparatively low power consumption.

Figure 6:
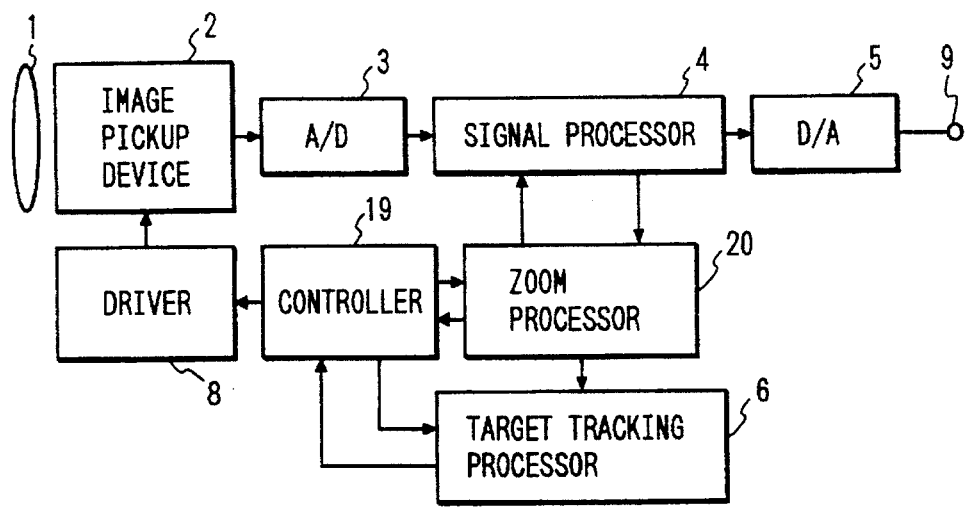
FIG. 6 is a block diagram of a video camera formed by incorporating a zoom processor into the video camera of FIG. 1.

Referring to FIG. 6 a video camera in a third embodiment according to the present invention comprises a lens unit 1, an image pickup device 2 of a CCD type or a MOS type, an A/D converter 3, a signal processor 4, a D/A converter 5, a target tracking processor 6, a driver 8 for driving the image pickup device 2, an output terminal 9, a controller 19 and a zoom processor 20. In FIG. 6, parts like or corresponding to those shown in FIG. 1 are denoted by the same reference characters.

This video camera is provided, in addition to the components of the video camera of FIG. 5, the zoom processor 20 to vary the size of a region to be extracted from the image displayed on the image screen shown in FIG. 2(a). Zooming is achieved electrically by the combination of the driving of the image pickup device 2, i.e., the CCD, and the control of the zoom processor 20; that is, vertical zooming is achieved by controlling the reading of signals from the image pickup device 2 and horizontal zooming is achieved by controlling the zoom processor 20. A zooming procedure and hardware for carrying out the same mentioned in "Terebijon Gakkai Zenkoku Taikai 1991 Yoko-shu", pp. 359–360 may be employed.

The zoom processor 20 may be set beforehand for a given zooming magnification so that the image of the target object is displayed in a desired size or the zooming magnification of the zoom processor 20 may be controlled by the controller 19 so that the image of the target object obtained by a feature calculating circuit 14 included in the target tracking processor 6 is displayed in a fixed size. When the zooming magnification is thus controlled by the controller 19, the image of the target object is displayed in a fixed size even if the target object moves toward and away from the video camera.

Since the video camera is capable of automatically tracking the target object and of varying the zooming magnification by processing signals, the image of the target object can be displayed in a fixed size even if the target object is moving. Since a small region in the image screen can be enlarged, the target tracking range of the video camera can be substantially extended.

Figure 7:
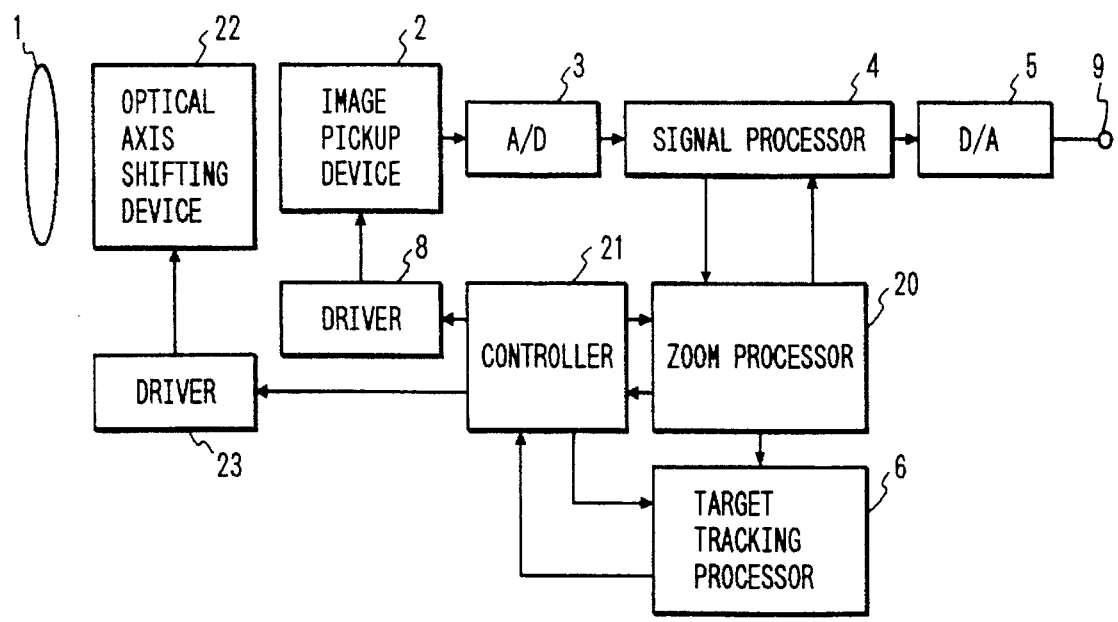
FIG. 7 is a block diagram of a video camera formed by incorporating an optical axis shifting circuit into the video camera of FIG. 6.

Referring to FIG. 7, a video camera in a fourth embodiment according to the present invention comprises a lens unit 1, an image pickup device 2 of a CCD type or a MOS type, an A/D converter 3, a signal processor 4, a D/A converter 5, a target tracking processor 6, a first driver 8 for driving the image pickup device 2, an output terminal 9, a zoom processor 20, an optical axis shifting device 22, such as an active prism, a second driver 23 for driving the optical axis shifting device 22, and a controller 21 for controlling the drivers 8 and 23 and the zoom processor 20. In FIG. 7, parts like or corresponding to those shown in FIG. 6 are denoted by the same reference characters. An active prism mentioned in, for example, "Nikkei Electronics", Vol. 7, No. 6, pp. 203–211, 1992 may be employed as the optical axis shifting device 22.

This video camera uses an optical target tracking method. The optical axis shifting device 22 provided with an active prism or the like shifts the optical axis of an optical image to be focused by the lens unit 1 on the light receiving surface of the image pickup device 2 to shift the optical image on the light receiving surface of the image pickup device 2. Accordingly, the optical axis shifting device 22 controls the optical axis so as to correct the positional difference between the centroid of the image of the target object detected by the target tracking processor 6 and the center of the image screen for target tracking. As mentioned above, the a feature calculating circuit 14 included in the target tracking processor 6 determines the centroid of an object region, and then the controller 21 controls the second driver 23 for driving the optical axis shifting device 22 so that the centroid coincides with the center of the image screen to achieve automatic target tracking.

Since the video camera employs only a small optical means, such as the active prism, for automatic target tracking, the video camera has a simple configuration and is capable operating at a comparatively low power consumption.

Figure 8:
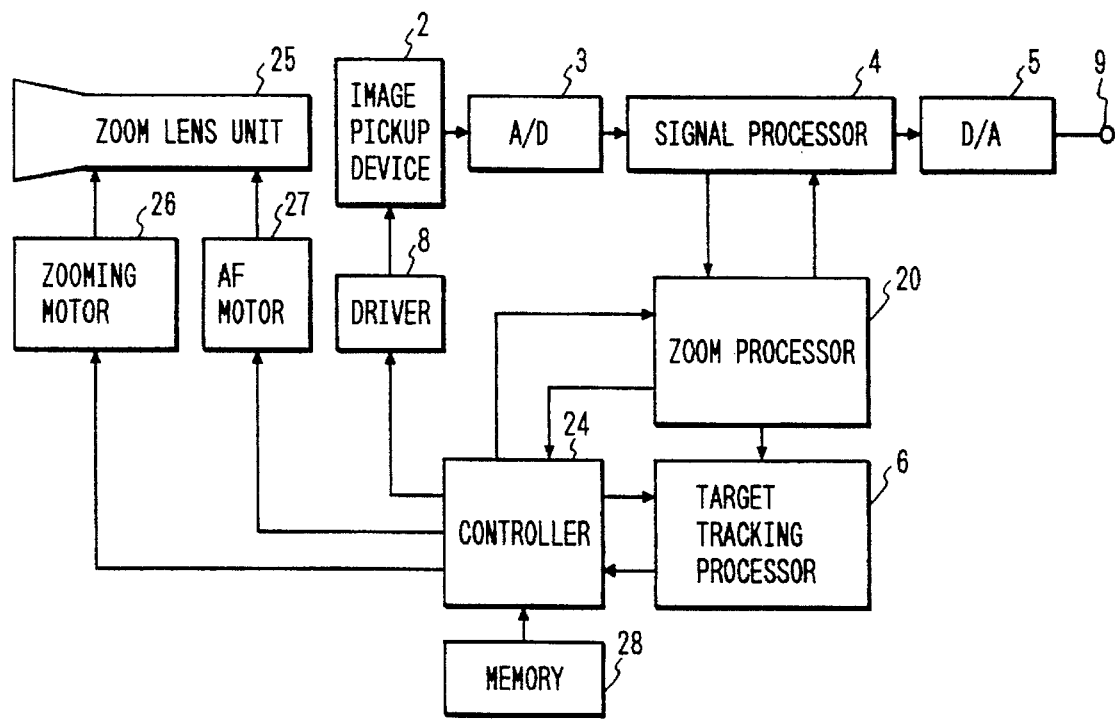
FIG. 8 is a block diagram of a video camera formed by incorporating a circuit for automatically controlling a zooming motor and an automatic focusing motor into the video camera of FIG. 6.

Referring to FIG. 8, a video camera in a fifth embodiment according to the present invention comprises a lens 1, an image pickup device 2 of a CCD type or a MOS type, an A/D converter 3, a signal processor 4, a D/A converter 5, a target tracking processor 6, a driver 8 for driving the image pickup device 2, an output terminal 9, a control circuit 19, a zoom processor 20, a zoom lens unit 25, a zooming motor 26 for driving the zoom lens unit 25, an AF motor (automatic focusing motor) 27 for driving a focusing lens, and a controller 24 for controlling the zooming motor 26, the AF motor 27, the driver 8 and the zoom processor 20. In FIG. 8, parts like or corresponding to those shown in FIG. 6 are denoted by the same reference characters.

This video camera is capable of tracking the target object by the same operation for reading the output signal of the image pickup device 2 and the same zooming operation as those described above and has the controller 24 for automatically controlling the zooming motor 26 and the AF motor 27. In this video camera, the optical zooming of the zoom lens unit 25 and automatic focusing operation are carried out automatically and most operations necessary for the management of the video camera are carried out automatically.

Automatic focusing can be achieved by controlling the AF motor 27 so that the focusing lens is focused on the target object. The target tracking processor 6 gives the data of an object region extracted by the extraction circuit 10 thereof to the controller 24, and then the controller 24 controls the AF motor 27 on the basis of signals representing the object region. This control operation of the controller 24 is the same as that illustrated in FIG. 1 of the specification of U.S. patent application Ser. No. 159,132. When the target object is a target person, an approximate value of the subject distance can be calculated on the basis of the size of the object region determined by the feature calculating circuit of the target tracking processor 6, because the sizes of persons, on the whole, are included in a fixed range. The AF motor 27 may be controlled for automatic focusing on the basis of the calculated subject distance.

In general, the video camera is directed toward an object (tracking or panning) and the zoom lens unit of the video camera is operated for zooming to determine an angle of view when the video camera is operated by the operator. Algorithms for those operations usually to be carried out by the operator are stored in the memory 28, and the controller 24 carries out control operations according to those algorithms. The video camera may use detachable card memories storing video taking patterns suitable for various scenes and professional cameraman's video taking patterns instead of the memory 28 to use the video taking patterns selectively for automatic image pickup operations.

This video camera has a simple configuration and is capable of operating at a comparatively low power consumption and of automatically operating in various video taking patterns.

Referring to FIG. 9, a video camera in a sixth embodiment according to the present invention comprises a lens 1, an image pickup device 2 of a CCD type of a MOS type, an A/D converter 3, a signal processor 4, a D/A converter 5, a target tracking processor 6, a driver 8 for driving the image pickup device 2, an output terminal 9, control circuit 19, a zoom processor 20, a zoom lens unit 25, a zooming motor 26 for driving the zoom lens unit 25, an AF motor 27 for controlling a focusing lens, a target setting switch 30, a marker generator 31, and a controller 29 for controlling the zooming motor 26, the AF motor 27, the driver 8, the zoom processor 20 and the marker generator 31. In FIG. 9, parts like or corresponding to those shown in FIG. 8 are denoted by the same reference characters.

First a target object to be tracked must be determined. Although it is possible, as mentioned above, to adjust the direction of the video camera so as to locate the image of a target object in the central region of the image screen before starting target tracking, this video camera requires the operator to specify the position of the target object. Once the position of the target object is thus specified, the video camera tracks the target object automatically.

The marker generator 31 generates a marker signal, and then the signal processor 4 superimposes the marker signal on a video signal. FIG. 10 shows a picture formed by superimposing the marker signal generated by the marker generator 31 on the video signal by the signal processor 4. The position of the marker on the screen may be changeable or may be fixed at the center of the screen. The marker is displayed on a monitor screen, such as the screen of an electronic viewfinder when the push-button of the switch 30 is pushed once, and the marker is set as a target object and recognized by the controller 29 when the push-button of the switch 30 is pushed again. In this state, the target tracking processor 6 detects the luminance and the distribution of chrominance of a region surrounding the marker. Then the controller 29 determines, on the basis of the luminance and the distribution of chrominance detected by the target tracking processor 6, extraction conditions on which the target tracking processor 6 extracts an object region. At the same time, the controller 29 sets a small region as an initial object region in the vicinity of the marker. A target object thus determined is tracked automatically by the above-mentioned procedure. The detection of the luminance and the distribution of chrominance, and determination of the extraction conditions on the basis of the detected luminance and the detected distribution of chrominance are achieved by using a sampling circuit illustrated in FIG. 3 of the specification of U.S. patent application Ser. No. 159,132 and giving data through the input terminal 16 to the target tracking processor 6. The marker generator 31 may be connected to the output side of the D/A converter 5 as illustrated in FIG. 1 of the foregoing U.S. patent application to display the marker only on the screen of the viewfinder. An target object can be readily set simply by positioning the initial object region on the marker and pushing the push-button of the switch 30.

Figure 11:
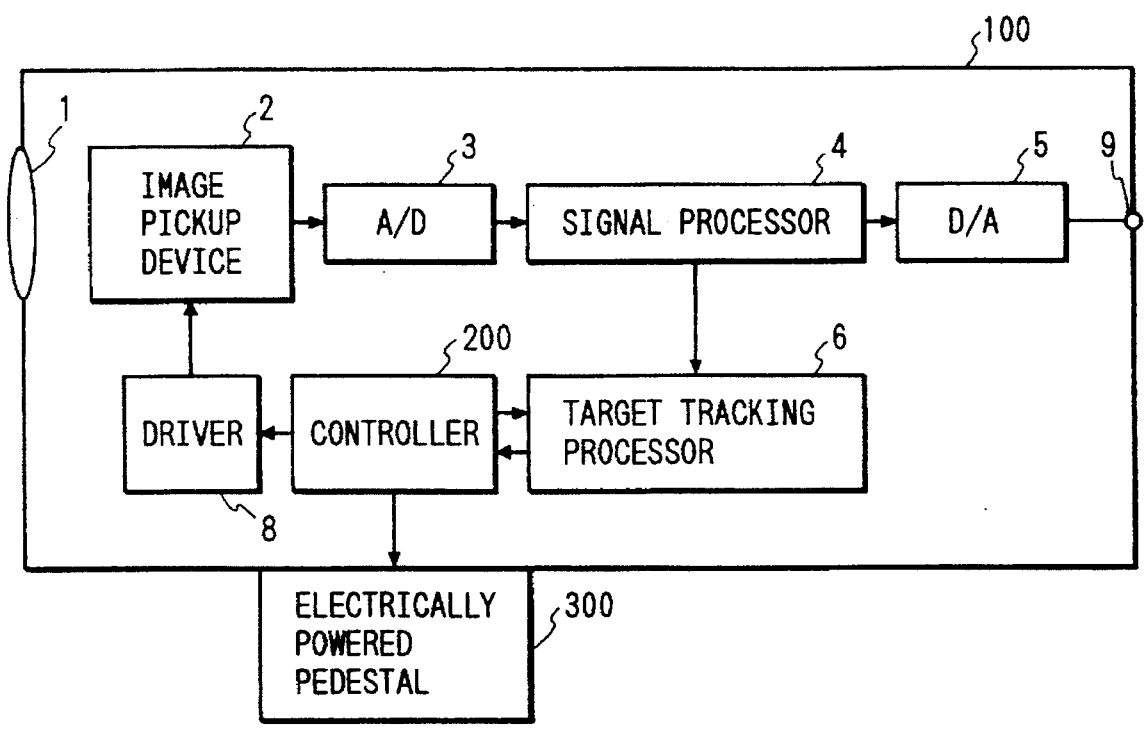
FIG. 11 is block diagram of an automatic target tracking camera system formed by mounting the video camera of FIG. 1 on an electrically powered pedestal.

FIG. 11 shows an automatic target tracking camera system constructed by mounting a video camera, which is similar to the video camera of FIG. 1, on an electrically powered pedestal. Referring to FIG. 11, the automatic target tracking camera system comprises a video camera 100 comprising, similarly to the video camera of FIG. 1, a lens unit 1, an image pickup device 2 of a CCD type of a MOS type, an A/D converter 3, a signal processor 4, a D/A converter 5, a target tracking processor 6, a controller 200, i.e., a microcomputer, a driver 8 and an output terminal 9, and an electrically powered pedestal 300 supporting the video camera 100. In FIG. 11, parts like or corresponding to those shown in FIG. 1 are denoted by the same reference characters. The controller 200 controls the driver 8 according to the coordinates of the centroid of an object region provided by the target tracking processor 6 to extract a signal representing an optional position on the imaging surface for target tracking and, at the same time, controls the pedestal 300 according to the coordinates of the centroid of the object region so that the target object is located in the central region of the imaging surface.

Figure 12A:
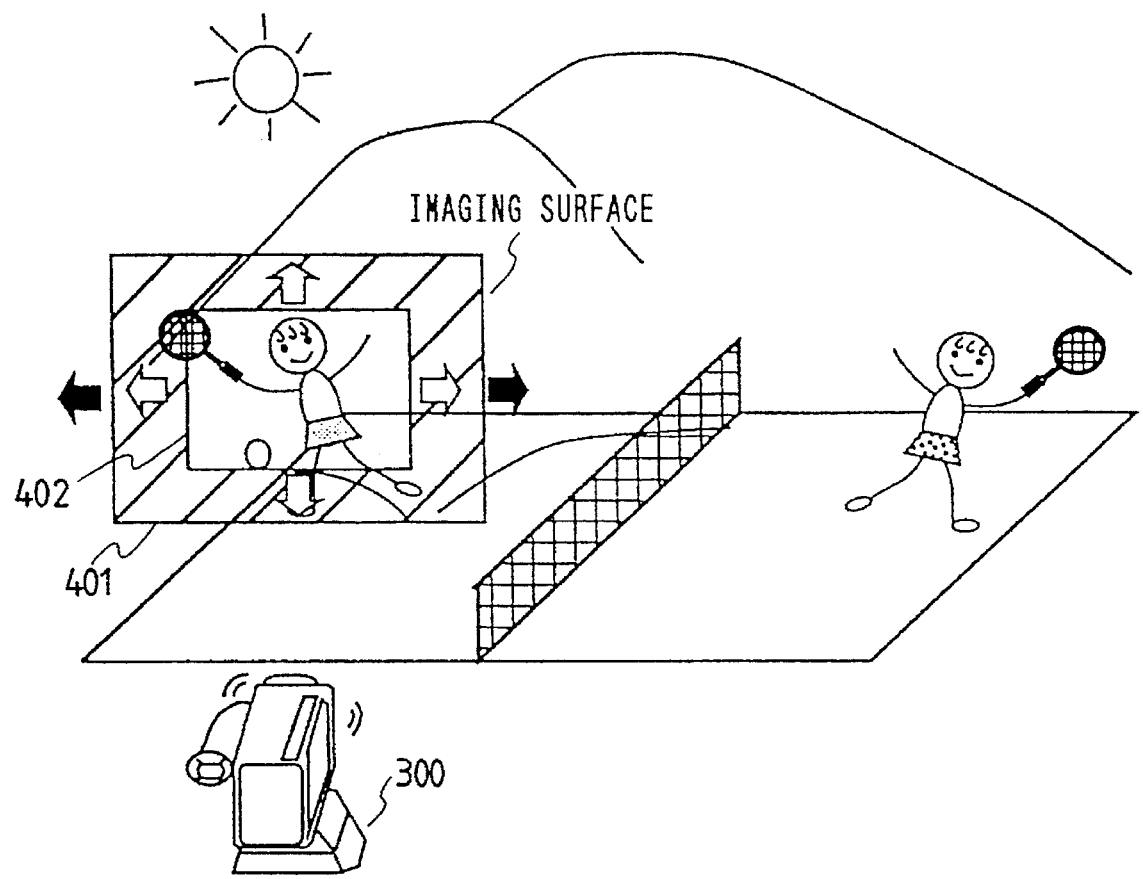
FIGS. 12(a) and 12(b) are pictorial views of assistance in explaining the operation of the automatic target tracking camera system of FIG. 11.
Figure 12B:
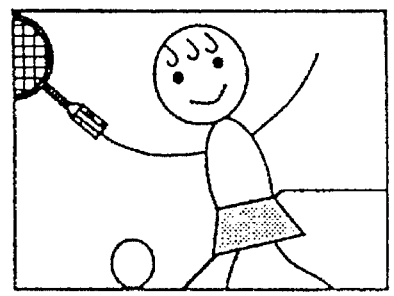

FIGS. 12(a) and 12(b) are pictorial views of assistance in explaining the target tracking operation of the automatic target tracking camera system of FIG. 11 as applied to tracking a specified player, i.e., a target object, playing tennis in which FIG. 12 (a) shows the target tracking principle and FIG. 12(b) shows the monitor screen. The driving of the pedestal 300, i.e., a mechanical means, and that of the image pickup device 2, i.e., an electrical means, are controlled in combination for target tracking.

Referring to FIG. 12(a), an image in a larger rectangular region 401 is formed on the light receiving surface of the image pickup device 2, and an image in a smaller rectangular region 402 is an effective image represented by a video signal actually provided by the image pickup device 2. An image in a hatched region is a marginal image which is picked up by the video camera 100 and is not displayed on a monitor screen. In FIG. 12(a), the blank arrows indicate the directions of control of the read position of the region provided by the image pickup device 2. The controller 200 gives the coordinates of a read start position on the image pickup device 2, i.e., the upper left-hand corner of the region 402, to the driver 8 to control the position of the effective region. These operations are the same as those described in connection with FIG. 2. The target object can be tracked only within the effective region 402 if only the driving of the image pickup device 2 is controlled for target tracking.

The automatic target tracking camera system of FIG. 11 is provided with the electrical target tracking means and the pedestal 300 in combination and the direction of the video camera 100 is controlled so that the image of the target object is formed always in the central region of the light receiving surface of the image pickup device 2. Therefore, the automatic target tracking camera system is capable of tracking the target object in a tracking range wider than a tracking range in which the target object can be tracked when only the electrical target tracking means is employed. Furthermore, the use of the electrical target tracking means and the mechanical target tracking means in combination enables automatic target tracking smoother and more accurate than automatic target tracking which can be carried out by using only the mechanical target tracking means. Accordingly, the target object can be tracked so that the image of the target object is formed always in the central region of the monitor screen, however wide the range of movement of the target object may be. FIG. 12(b) shows an image displayed on the monitor screen corresponding to an image in the region 402 corresponding to a video signal obtained by processing an image signal provided by the image pickup device 2 by the signal processor 4. In FIG. 12(b), the player, i.e., the target object, is displayed in the central region of the monitor screen.

Figure 13:
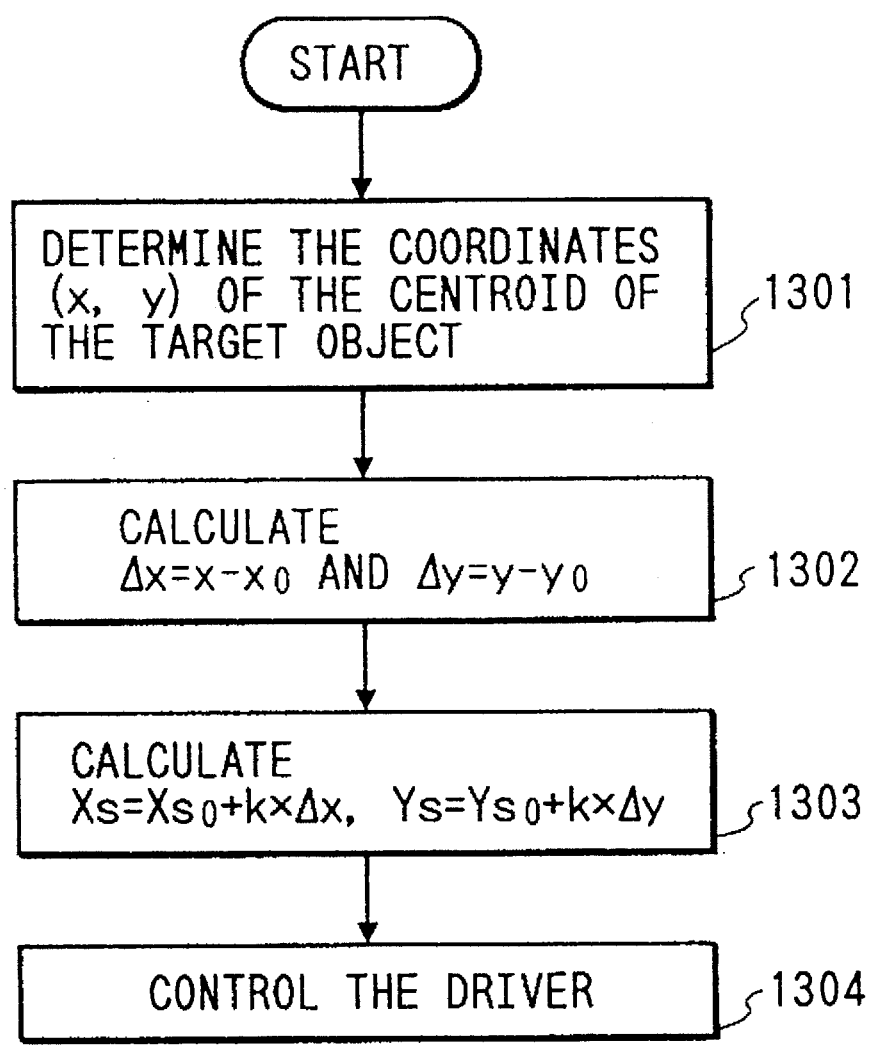
FIG. 13 is a flow chart of a procedure to be carried out by a controller included in the automatic target tracking camera system of FIG. 11 to control a driver.

FIG. 13 is a flow chart of a procedure for controlling the driving of the image pickup device 2 to be carried out by the controller 200. Referring to FIG. 13, the controller 200 receives the coordinates (x, y) of the centroid of the image of the target object from the target tracking processor 6 in step 1301, and then the controller 200 calculates the differences ($\Delta x$, $\Delta y$) between the coordinates of the centroid and those of the center of the screen in step 1302. In step 1303, the controller 200 determines the coordinates (Xs, Ys) of a read start position on the image pickup device 2 by using expressions:

$$Xs = Xs_o + k \times \Delta x$$

$$Ys = Ys_o + k \times \Delta y$$

where k is a constant relating with coordinate transformation and time constant. Then, the controller 200 gives the coordinates (Xs, Ys) of the read start position to the driver 8 in step 1304 to locate the target object in the central region of the monitor screen so that a determination of a read start position on the imaging surface is effected.

Figure 14:
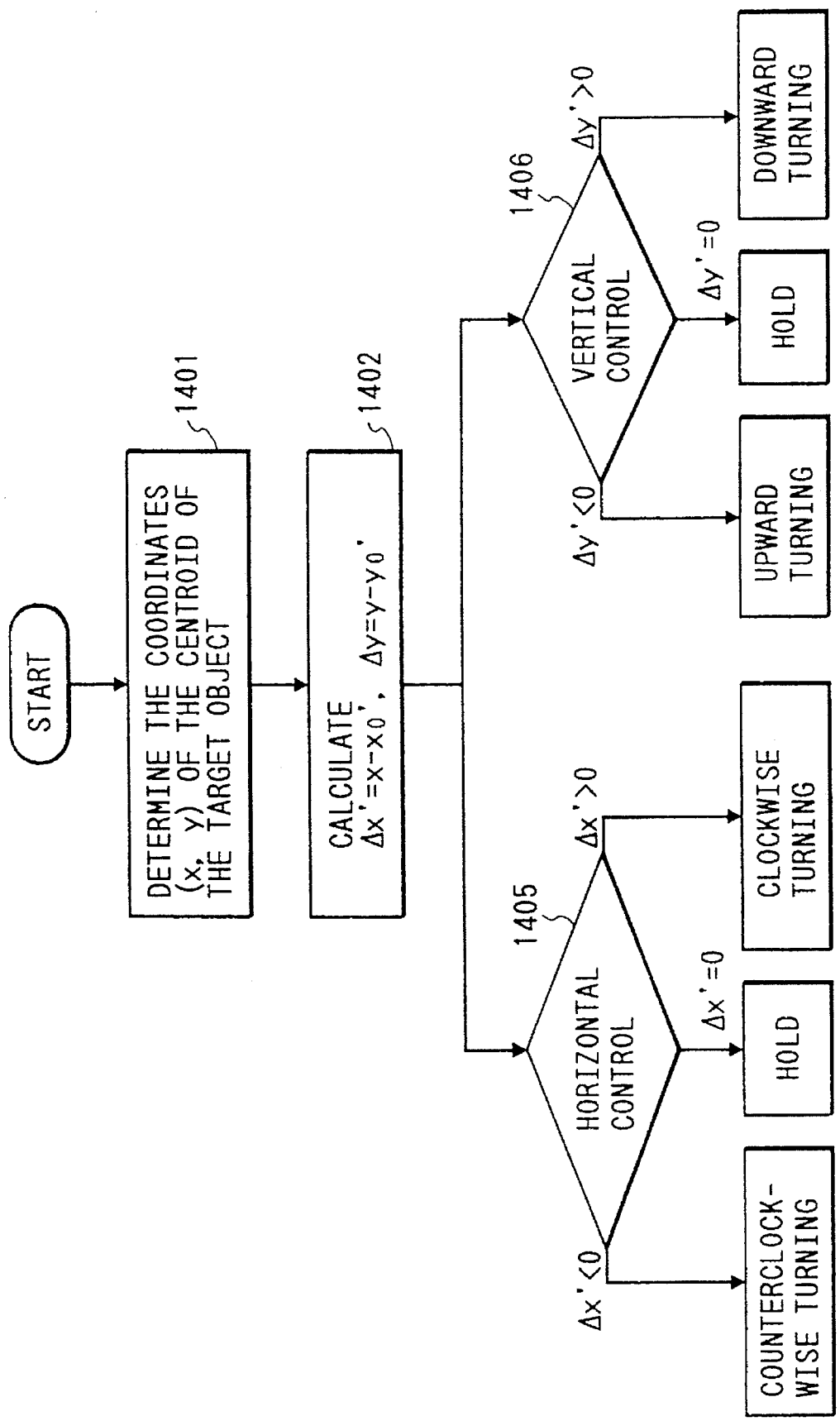
FIG. 14 is a flow chart of a procedure to be carried out by the controller of the automatic target tracking camera system of FIG. 11 to control the electrically powered pedestal.

FIG. 14 is a flow chart of a procedure for controlling the pedestal 300 to be carried out by the controller 200. Referring to FIG. 14, the controller 200 receives the coordinates (x, y) of the centroid of the image of the target object from the target tracking processor 6 in step 1401, and then the controller 200 determines the differences ($\Delta x'$, $\Delta y'$) between the coordinates (x, y) of the centroid and those of the center of the light receiving surface of the image pickup device 2 in step 1402. If the pedestal 300 is incapable of moving the video camera 100 vertically, only the horizontal difference $\Delta x'$ is determined. In step 1405, the pedestal 300 is turned clockwise when $\Delta x' > 0$, the pedestal 300 is turned counterclockwise when $\Delta x' < 0 < 0$ or the pedestal 300 is not turned when $\Delta x' = 0$. In step 1406, the pedestal 300 is turned downward when $\Delta y' < 0$, the pedestal 300 is turned upward when $\Delta y' > 0$ or the pedestal 300 is not turned when $\Delta y' = 0$. Thus, the controller 200 controls the position of the image of the target object so that the image of the target object is formed in the central region of the image pickup device 2 with respect to both the vertical and horizontal directions by giving control signals to the pedestal 300.

Thus, the execution of the control procedures shown in FIGS. 13 and 14 enables automatic target tracking in a tracking range wider than a tracking range in which the target object can be tracked when only the electrical target tracking means is employed and automatic target tracking smoother and more accurate than that which can be carried out by using only the mechanical target tracking means. Accordingly, the target object can be tracked so that the image of the target object is formed always in the central region of the monitor screen, however wide the range of movement of the target object may be.

Figure 15:
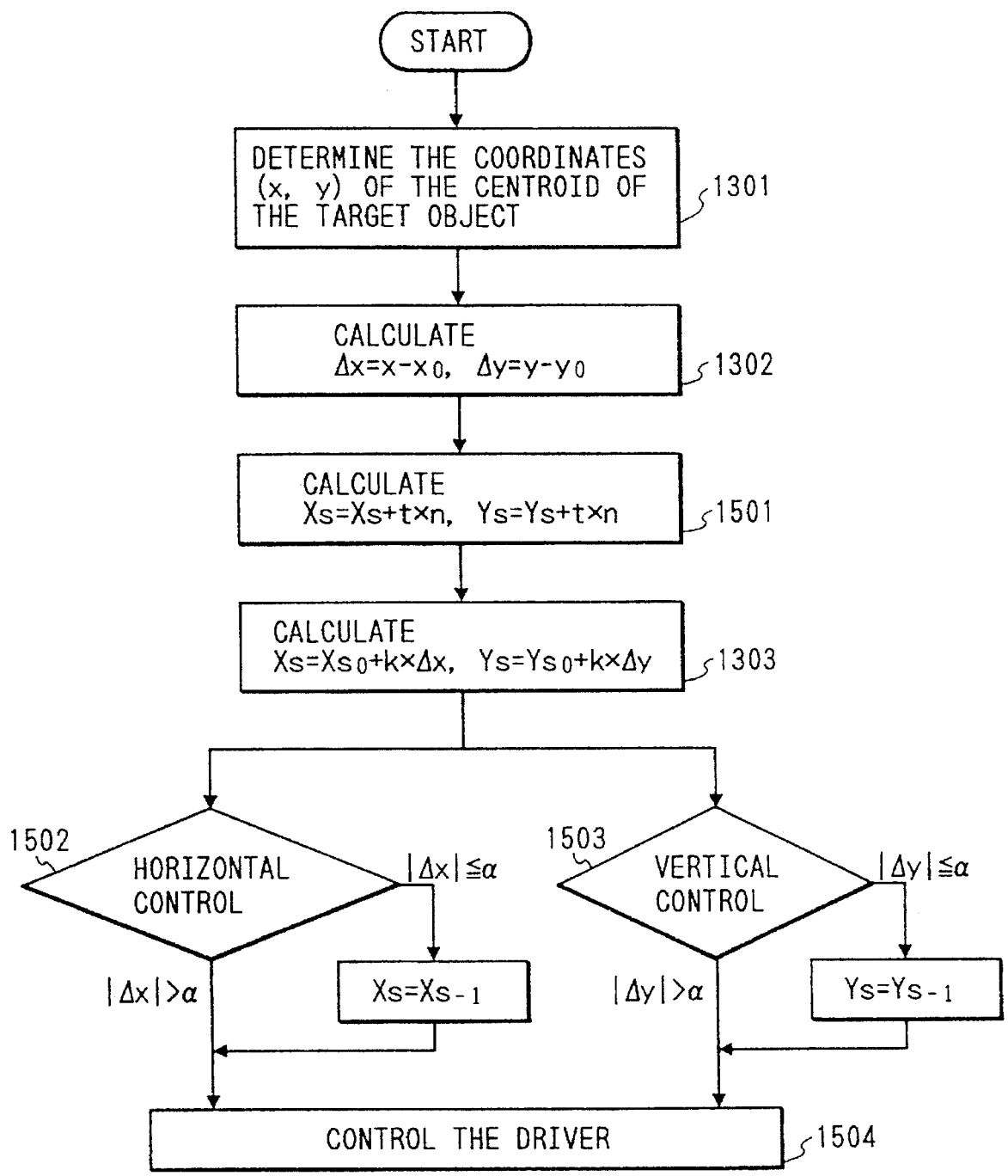
FIG. 15 is a flow chart of a procedure to be carried out by the controller of the automatic target tracking camera system to control a driver.
Figure 16:
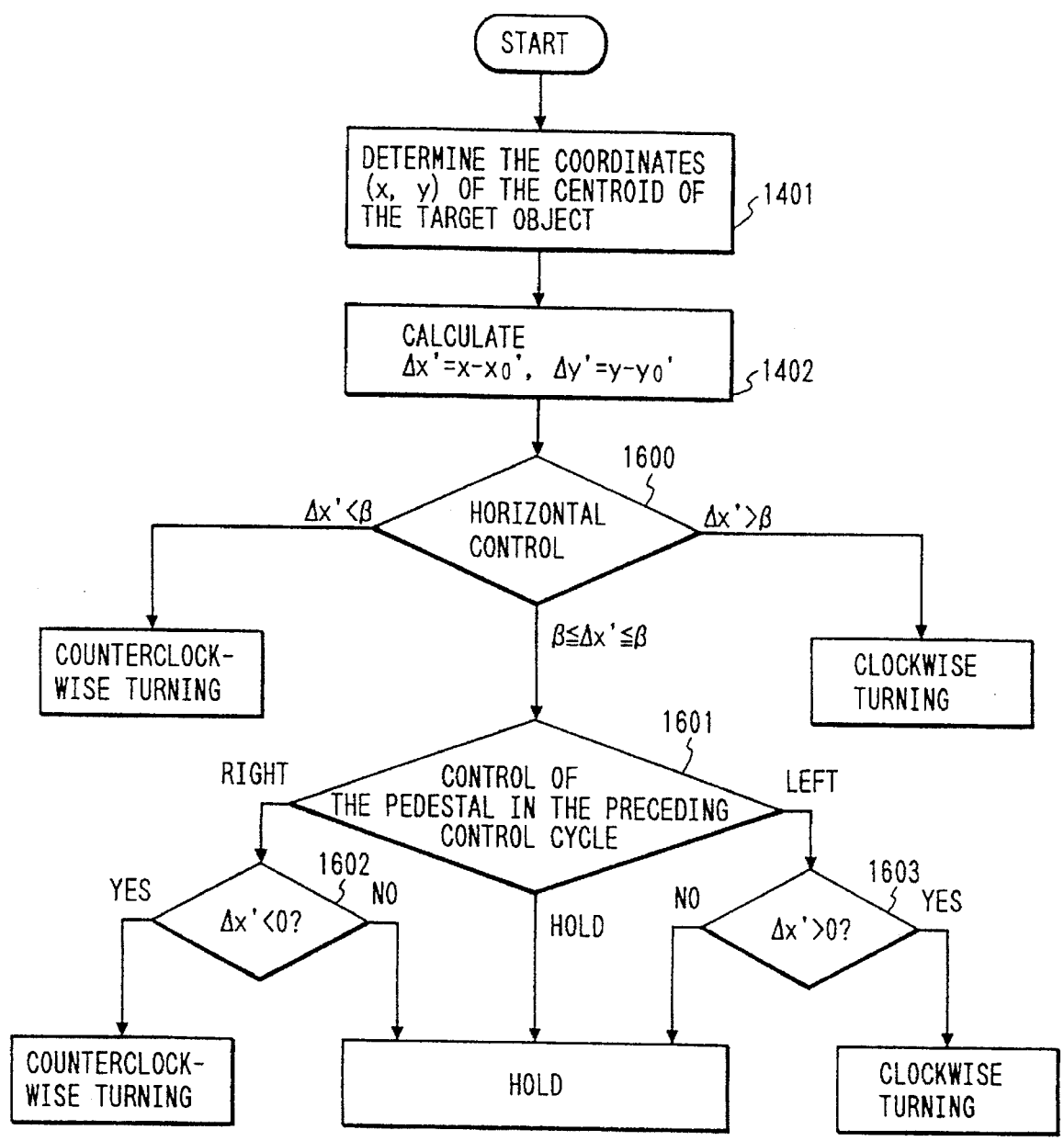
FIG. 16 is a flow chart of another procedure to be carried out by the controller of the automatic target tracking camera system to control the electrically powered pedestal.

FIGS. 15 and 16 are further target tracking control procedures to be carried out by the controller 200. The target tracking control procedures shown in FIGS. 13 and 14 have the following drawbacks.

1. The ceaseless, repetitive turning motion in opposite directions makes the target tracking operation restless.

Figure 17:
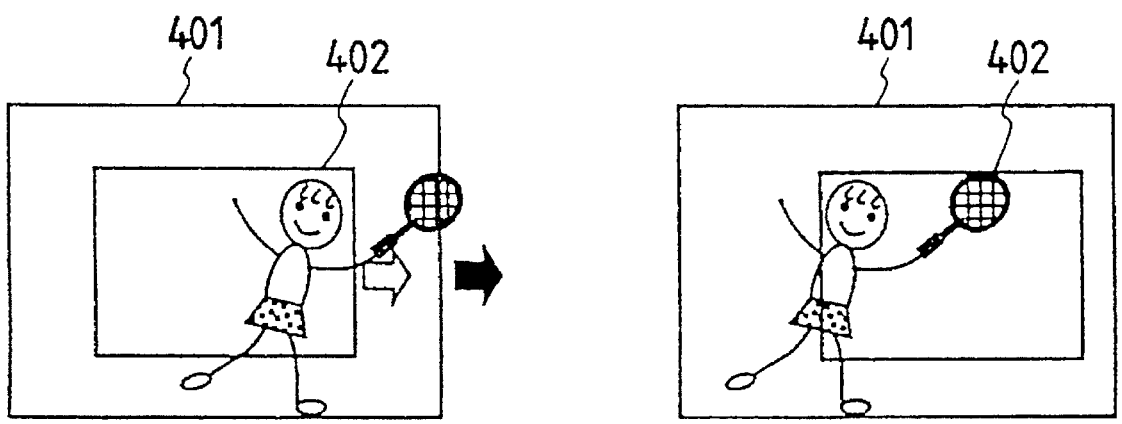
FIG. 17 is a pictorial view of assistance in explaining problems in control operations represented by the flow charts of FIGS. 13 and 14.

2. The individual control of the driving of the pedestal and the image pickup device will cause overshooting in a state shown in FIG. 17 wherein the blank arrow indicates the direction in which the object region is moved and the solid arrow indicates the direction in which the pedestal is controlled.

To eliminate these drawbacks, the target tracking control procedures shown in FIGS. 15 and 16 allow for a neutral zone in which the differences between the coordinates of the centroid of the image of the target object and those of the center of the screen are not greater than a fixed value and the differences between the coordinates of the centroid of the image of the target object and those of the center of the light receiving surface of the image pickup device 2 are not greater than a fixed value, and correct the motion of the pedestal 300 in determining the coordinates of a read start position on the light receiving surface of the image pickup device 2.

FIG. 15 is a flow chart of a control procedure for control of the read position on the imaging surface and for controlling the driving of the image pickup device 2. The controller 200 receives the coordinates (x, y) of the centroid of a target object from the target tracking processor 6 in step 1301, determines the differences ($\Delta x$, $\Delta y$) between the coordinates of the centroid and those of the center of the screen in step 1302, and determines the coordinates (Xs, Ys) of a read start position on the light receiving surface of the image pickup device 2 in steps 1303. These steps are the same as the corresponding steps shown in FIG. 13. Suppose that the light receiving surface of the image pickup device 2 is moved by n in one image device driving control cycle. Then, n is used as a correction for correcting the movement of the pedestal 300, and the coordinates of a read start position is calculated in step 1503 by using expressions:

$$Xs = Xs_o + k \times \Delta x + t \times n$$

$$Ys = Ys_o + k \times \Delta y + t \times n$$

where t is a constant relating with time constant. If the pedestal 300 is capable of turning only in a horizontal plane, only the horizontal coordinate may be corrected.

When the differences ($\Delta x$, $\Delta y$) between the coordinates of the centroid and those of the center of the screen are not greater than a fixed value $\alpha$ i.e., if the responses to queries made in steps 1502 and 1503 to see if the differences (-x, -y) are greater than the fixed value are negative, $Xs = Xs_{-1}$ and $Ys = Ys_{-1}$, where $Xs_{-1}$ and $Ys_{-1}$ are the coordinates of the read start position determined in the preceding control cycle.

FIG. 16 is a flow chart of a pedestal control procedure for controlling the pedestal 300. This pedestal control procedure, similarly to that shown in FIG. 14, calculates the differences ($-\Delta x'$, $-\Delta y'$) between the coordinates of the centroid of the target object and the center of the light receiving surface of the image pickup device 2 and controls the pedestal 300 on the basis of the differences ($\Delta x'$, $\Delta y'$). When the differences ($\Delta x'$, $\Delta y'$) are in a neutral zone, in which the differences ($\Delta x'$, $\Delta y'$) are smaller than a fixed value $\beta$ the pedestal 300 is not moved (step 1600). The tracking range in which the target object can be tracked by controlling the driving of the image pickup device 2 with the image of the target object located in the central region of the light receiving surface of the image pickup device 2 is wider than a range in which the target object can be tracked by controlling the driving of the image pickup device 2 with the image of the target object dislocated from the central region of the light receiving surface of the image pickup device 2. Therefore, the pedestal 300 is turned (steps 1601, 1602) even if the difference is within the neutral zone, provided that the pedestal 300 was turned in the preceding control cycle and the difference indicates a turning direction in which the pedestal 300 is desired to be turned.

The automatic target tracking camera system thus controlled by the control procedures shown in FIGS. 15 and 16 is capable of further accurate target tracking.

Although not illustrated herein, the video cameras of FIGS. 5, 6, 7, 8 and 9 may be mounted on the pedestal 300 in a manner as shown in FIG. 11 and those video cameras and the pedestal 300 may be controlled by the control procedures shown in FIGS. 13 and 14 or FIGS. 15 and 16 to make the best use of the respective characteristics of those video cameras for target tracking. The control procedures of FIGS. 13 and 14 or FIGS. 15 and 16 are applicable also to a video camera provided with a movable image pickup unit and not mounted on the pedestal.

Figure 18A:
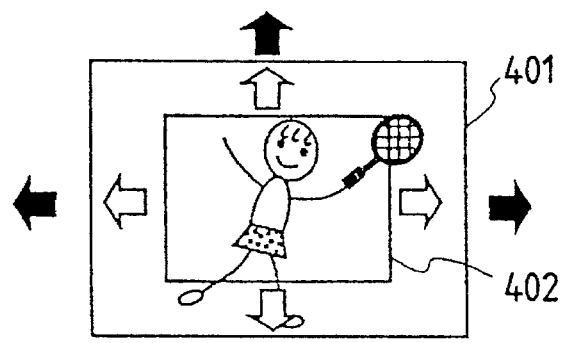
FIGS. 18(a), 18(b) and 18(c) are pictorial views of assistance in explaining various control modes in which an automatic target tracking camera system functions for control operations.
Figure 18B:
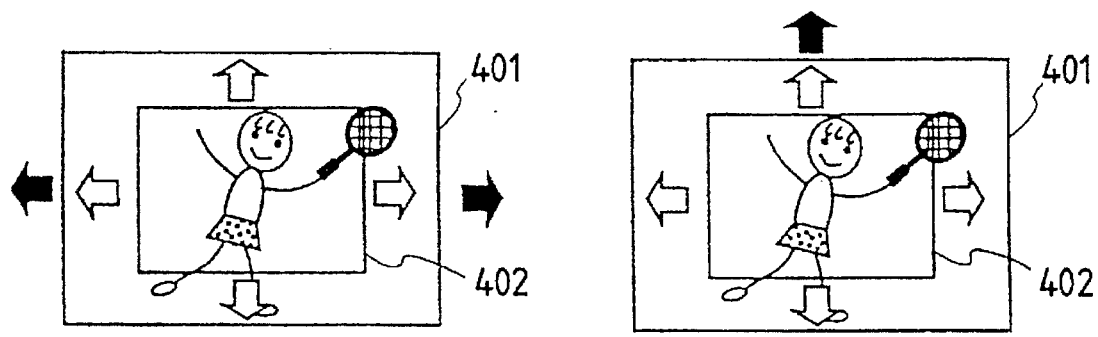
Figure 18C:
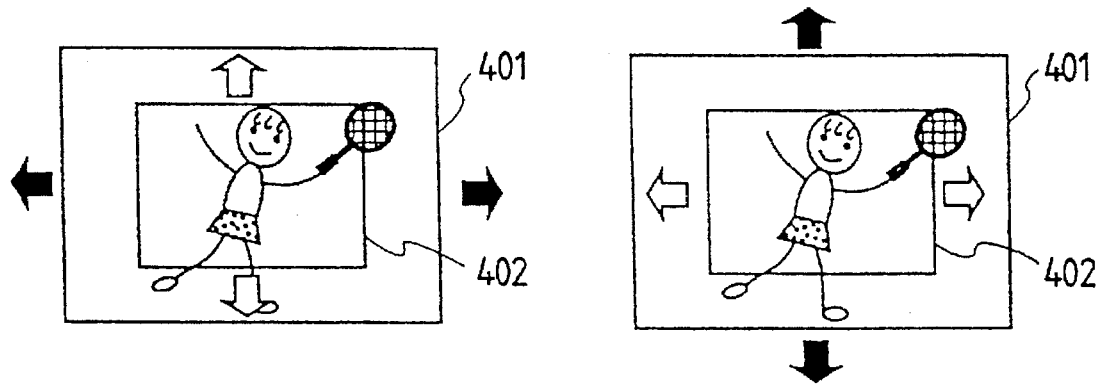

FIGS. 18(a), 18(b) and 18(c) are examples of combinations of target tracking control procedures in accordance with the present invention. In FIGS. 18(a), 18(b) and 18(c), a larger rectangular region 401 corresponds to the light receiving surface of the image pickup device 2, and a smaller rectangular region 402 is a region from which video signals are read through the control of the driving of the image pickup device 2 or the control or zooming. The solid arrows on the outside of the regions 401 indicate directions in which the direction of the video camera 100 or the optical axis of the same is controlled by the pedestal 300 or the optical axis shifting device 22, and the blank arrows indicate directions in which the object region 402 from which video signals are read is moved by the control of the driving of the image pickup device 2 or the control of zooming.

In the example shown in FIG. 18(a), both the regions 401 and 402 are moved two-dimensionally; the video camera is controlled by a mechanical or optical means capable of tracking the target object in a comparatively wide range so that the image of the target object is formed in the vicinity of the center of the light receiving surface of the image pickup device 2, and by an electrical means so that the image of the target object is formed in the central region of the monitor screen. In the example shown in FIG. 18(b), the region 401 is moved linearly vertically or horizontally, i.e., one-dimensional, and the region 402 is moved two-dimensionally. For example, this example is capable of tracking the target object in a two-dimensional range even if the pedestal is capable of turning only in a horizontal plane and hence this example is simple and suitable for tracking a target object which moves in a wide horizontal range and in a narrow vertical range. In the example shown in FIG. 18(c), both the regions 401 and 402 are moved linearly i.e., one-dimensional. For example, the pedestal is used for horizontal target tracking and the control of the driving of the image pickup device 2 is used for vertical target tracking. Since the different target tracking means are used respectively for vertical target tracking and horizontal target tracking, the example of FIG. 18(c) is still more simple than the example of FIG. 18(b).

We claim:

1. A video camera comprising:
    an image pickup device having a plurality of light receiving elements in a two-dimensional arrangement on an imaging surface thereof for producing an image signal through the photoelectric conversion of an optical image focused on the imaging surface by a lens unit;
    a driver which drives the image pickup device to read the image signal from a part of the light receiving elements located in a specified region of the imaging surface;
    a signal processor which produces a video signal indicating the luminance and chrominance on the basis of the image signal;
    a target tracking processor which processes the video signal on the basis of predetermined conditions and continuously provides a signal representing a current object region; and
    a controller which continuously determines a location of the specified region of the imaging surface representing the current object region, so that the object region is located substantially in the center of the specified region, the controller providing an output to the driver for specifying the location of the specified region;
    wherein the target tracking processor is provided with an extractor which makes a decision as to whether or not the video signal meets the predetermined conditions and generates an extraction signal representing an extracted region meeting the predetermined conditions; and
    wherein the predetermined conditions require that the luminance and chrominance of the video signal are within fixed ranges, respectively.

2. A video camera according to claim 1, wherein the predetermined conditions require that the luminance and chrominance of the video signal are within ranges of luminance and chrominance corresponding to those of flesh color.

3. A video camera according to claim 1, wherein the target tracking processor is further provided with a memory for storing the object region determined a certain time before and a comparator which compares the contents of the memory and the extraction signal and generates a signal representing an overlapping region in a region represented by the extraction signal overlapping a region represented by the contents of the memory, and the object region is determined on the basis of the overlapping region.

4. A video camera according to claim 3, wherein the target tracking processor is provided further with a region enlarging means which receives the signal representing the overlapping region and generates a signal representing an enlarged region obtained by enlarging the overlapping region at a fixed enlargement ratio, and the objective region is the enlarged region.

5. A Video camera according to claim 1, wherein the target tracking processor is provided with a calculating means for calculating the features of the object region, and provides a feature signal representing the features of the object region.

6. A video camera according to claim 5, wherein the features of the object region are the size and the position of the centroid of the object region.

7. A video camera according to claim 6, further comprising a zoom processor for processing the video signal provided by the signal processor to change the size of a specified part of an image formed on the imaging surface, wherein the controller controls the zoom processor so that the specified part of the image formed on the imaging surface is reduced or enlarged according to the size of the object region.

8. A video camera according to claim 6, further comprising a zoom lens unit and a zooming motor for driving the zoom lens unit, wherein the controller controls the zooming motor so that the specified part of the image formed on the imaging surface is enlarged or reduced according to the size of the object region.

9. A video camera according to claim 6, further comprising a zoom lens unit and an automatic focusing motor for driving the zoom lens unit, wherein the controller calculates the subject distance on the basis of the size of the object region and controls the automatic zooming motor.

10. A video camera according to claim 1, further comprising an optical axis shifting means for shifting the optical axis of the image focused by the lens unit, and a second driver for driving the optical axis shifting means, wherein the controller controls the second driver on the basis of the signal representing the object region so that the object region is displayed in the substantially central region of the monitor screen.

11. A video camera according to claim 1, further comprising a zoom processor for processing the video signal provided by the signal processor to change the size of a specified part of the image formed on the imaging surface, and a memory storing algorithms defining procedures for automatic panning, zooming and focusing according to the condition of the scene, wherein the controller controls the zoom processor according to the algorithms stored in the memory and signals given thereto by the target tracking processor.

12. A video camera according to claim 1, further comprising a zoom lens unit and a zooming motor for driving the zoom lens unit, wherein the controller controls the zooming motor according to the algorithms stored in a memory and signals given thereto by the target tracking processor.

13. A video camera according to claim 1, further comprising a region specifying means to be operated by the operator to specify a region on the monitor screen and a sampling circuit for sampling video signals representing a region specified by the region specifying means.

14. A video camera according to claim 13, wherein the region specifying means comprises a push button and a marker displaying means for displaying a marker on the monitor screen, and a region corresponding to the marker when the push button is pushed is the specified region.

15. A video camera according to claim 1, further comprising a mechanism for moving a range on the imaging surface on which the image is focused by the lens unit, wherein the controller controls the mechanism so that the object region will be always included in the imaging surface.

16. A video camera according to claim 15, wherein the mechanism is an electrically powered pedestal mounted with the video camera and capable of changing the direction of the video camera.

17. A video camera according to claim 15, wherein the mechanism is an active prism interposed between the lens unit and the image pickup device.

18. A video camera according to claim 15, wherein the controller controls the mechanism so that the object region is located substantially in the central region of the monitor screen with respect to the horizontal direction, and controls the driver so that the object region including the image of the target object is located substantially in the central region of the monitor screen with respect to the vertical direction.

19. A video camera according to claim 15, wherein the controller controls the mechanism so that the object region is substantially in the central region of the monitor screen with respect to the vertical direction, and controls the driver so that the object region including the image of the target object is located substantially in the central region of the monitor screen with respect to the horizontal direction.

20. A video camera according to claim 1, wherein the driver drives the image pickup device to read the image signal only from a part of the light receiving elements located in a specified region of the imaging surface.

21. A video camera comprising:
an image pickup means capable of producing image data through the photoelectric conversion of an optical image focused on its imaging surface by a lens unit;
a storage means for temporarily storing the image data produced by the image pickup means;
a signal processing means for producing a video signal indicating the luminance and chrominance on the basis of the image data;
a target tracking processor means which processes the current video signal on the basis of predetermined conditions and continuously provides a signal representing a current object region; and
a control means which determines at all times, on the basis of the signal representing the current object region, so that the object region is located in the substantially central region of a monitor screen;
wherein the predetermined conditions require that the luminance and chrominance of the video signal are in fixed ranges respectively.

22. A video camera comprising:
an image pickup means capable of producing image data through the photoelectric conversion of an optical image focused on its imaging surface by a lens unit;
a storage means for temporarily storing the image data produced by the image pickup means;
a signal processing means for producing a video signal indicating the luminance and chrominance on the basis of the image data;
a target tracking processor means which processes the current video signal on the basis of predetermined conditions and continuously provides a signal representing a current object region; and
a control means which determines at all times, on the basis of the signal representing the current object region, so that the object region is located in the substantially central region of a monitor screen;
wherein the predetermined conditions require that the luminance and chrominance of the video signal are in ranges of luminance and chrominance corresponding to those of flesh color.

23. A video camera comprising:
an image pickup means capable of producing image data through the photoelectric conversion of an optical image focused on its imaging surface by a lens unit;
a storage means for temporarily storing the image data produced by the image pickup means;
a signal processing means for producing a video signal indicating the luminance and chrominance on the basis of the image data;
a target tracking processor means which processes the current video signal on the basis of predetermined conditions and continuously provides a signal representing a current object region; and
a control means which determines at all times, on the basis of the signal representing the current object region, so that the object region is located in the substantially central region of a monitor screen;
wherein the target tracking processor means is provided with an extraction means which makes a decision as to whether or not the video signal meets the predetermined conditions; and generates an extraction signal representing an extracted region meeting the predetermined conditions, and the target tracking processor means is further provided with a second storage means for storing the object region determined a certain time before and a compactor means which compares the contents of the second storage means and the extraction signal and generates a signal representing an overlapping region in a region represented by the contents of the second storage means, and the object region is determined on the basis of the overlapping region.

24. A video camera according to claim 23, wherein the target tracking processor means is provided further with a region enlarging means which receives the signal representing the overlapping region and generates a signal representing an enlarged region obtained by enlarging the overlapping region at a fixed enlargement ratio, and the object region is the enlarged region.

25. A video camera comprising;
an image pickup means capable of producing image data through the photoelectric conversion of an optical image focused on its imaging surface by a lens unit;
a storage means for temporarily storing the image data produced by the image pickup means;
a signal processing means for producing a video signal indicating the luminance and chrominance on the basis of the image data;
a target tracking processor means which processes the current video signal on the basis of predetermined conditions and continuously provides a signal representing a current object region; and
a control means which determines at all times, on the basis of the signal representing the current object region, so that the object region is located in the substantially central region of a monitor screen;
wherein the image pickup means and the storage means are comprised of an image pickup device of a CCD type or a MOS type, capable of photoelectric signal conversion and storage, the control means controls the driving of the image pickup device to control the read operation of the signal processing means.

26. A video camera comprising:
an image pickup means capable of producing image data through the photoelectric conversion of an optical image focused on its imaging surface by a lens unit;
a storage means for temporarily storing the image data produced by the image pickup means;
a signal processing means for producing a video signal indicating the luminance and chrominance on the basis of the image data;
a target tracking processor means which processes the current video signal on the basis of predetermined conditions and continuously provides a signal representing a current object region;
a control means which determines at all times, on the basis of the signal representing the current object region, so that the object region is located in the substantially central region of a monitor screen; and a mechanism for moving a range of the imaging surface on which the image is focused by the lens unit;

wherein the control means controls the mechanism so that the object region will be always included in the imaging surface and so that the object region is located substantially in the central region of the monitor screen with respect to the horizontal direction, and controls the operation of the signal processing means for reading data from the storage means so that the object region including the extracted object is located substantially in the central region of the monitor screen with respect to the vertical direction.

27. A video camera comprising:

an image pickup means capable of producing image data through the photoelectric conversion of an optical image focused on its imaging surface by a lens unit;

a storage means for temporarily storing the image data produced by the image pickup means;

a signal processing means for producing a video signal indicating the luminance and chrominance on the basis of the image data;

a target tracking processor means which processes the current video signal on the basis of predetermined conditions and continuously provides a signal representing a current object region;

a control means which determines at all times, on the basis of the signal representing the current object region, so that the object region is located in the substantially central region of a monitor screen; and a mechanism for moving a range of the imaging surface on which the image focused by the lens unit;

wherein the control means controls the mechanism so that the object region will be always included in the imaging surface and so that the object region is located substantially in the central region of the monitor screen with respect to the vertical direction and controls the operation of the signal processing means for reading the contents of the storage means.

28. A video camera comprising:

an image pickup means capable of producing an image signal through the photoelectric conversion of an optical image focused on its imaging surface by a lens unit;

a signal processing means which produces a video signal indicating the luminance and chrominance on the basis of the image signal;

a storage means for storing an object region which has previously been determined;

an extraction means which receives the video signal, and provides a signal representing an extracted region in which the video signal satisfies predetermined conditions;

a comparator means which receives a signal read from the storage means and the output signal of the extraction means, and provides a signal representing an overlapping region in which the object region and the extracted region overlap each other;

a region enlarging means which receives the output signal of the comparator means and gives a signal representing a new object region determined by enlarging the overlapping region at a predetermined enlargement ratio; and a control means which functions for target tracking control operation to keep the new object region within a monitor screen on which the video signal is displayed.

29. A video camera according to claim 28, wherein the predetermined conditions require that the luminance and chrominance of the video signal are within fixed ranges, respectively.

30. A video camera according to claim 28, wherein the predetermined conditions require that the luminance and chrominance of the video signal are within ranges of luminance and chrominance corresponding to those of flesh color.

31. A video camera according to claim 28, further comprising a calculating means for calculating the features of the object region, wherein the control means carries out target tracking control operations according to the features of the object region.

32. A video camera according to claim 31, wherein the features are the size and the position of the centroid of the object region.

33. A video camera according to claim 28, further comprising an image memory for temporarily storing the image signal, wherein the control means reads the image signal from a specified area of the image memory for target tracking control operation.

34. A video camera according to claim 28, wherein the image pickup means is comprised of an image pickup device of a CCD type of a MOS type, the control means controls the image pickup device by specifying a read position for target tracking control operation.

35. A video camera according to claim 28, further comprising a mechanism for moving a range on the imaging surface on which the image is focused by the lens unit, wherein the control means controls the driving of the mechanism for target tracking control operation.

36. A video camera according to claim 35, wherein the mechanism is an electrically powered pedestal supporting the video camera and capable of changing the direction of the video camera.

37. A video camera according to claim 35, wherein the mechanism is an active prism interposed between the lens unit and the image pickup means.

\* \* \* \* \*